United States Patent
Chu

(10) Patent No.: US 11,221,094 B2
(45) Date of Patent: Jan. 11, 2022

(54) CORRUGATED TUBE

(71) Applicant: Schlemmer Holding GmbH, Aschheim (DE)

(72) Inventor: Van Ngoc Chu, Poing (DE)

( * ) Notice: Subject to any disclaimer, the term of this patent is extended or adjusted under 35 U.S.C. 154(b) by 0 days.

(21) Appl. No.: 16/754,354

(22) PCT Filed: Oct. 5, 2018

(86) PCT No.: PCT/EP2018/077107
§ 371 (c)(1),
(2) Date: Apr. 7, 2020

(87) PCT Pub. No.: WO2019/072706
PCT Pub. Date: Apr. 18, 2019

(65) Prior Publication Data
US 2020/0309288 A1    Oct. 1, 2020

(51) Int. Cl.
*F16L 11/15*    (2006.01)

(52) U.S. Cl.
CPC .................................. *F16L 11/15* (2013.01)

(58) Field of Classification Search
CPC .... F16L 11/11; F16L 11/15; F16L 9/06; F16L 55/02; F16L 27/11; F16L 51/02; H03G 3/04; B29D 23/18
USPC .......................................... 138/121, 122, 118
See application file for complete search history.

(56) References Cited

U.S. PATENT DOCUMENTS

| | | |
|---|---|---|
| 3,234,969 A | 2/1966 | Du Mont |
| 5,971,033 A * | 10/1999 | Lanz .................. F16L 9/06 138/121 |
| 6,131,616 A * | 10/2000 | Tatsuta ................. F16L 11/11 138/110 |
| 6,394,143 B1 | 5/2002 | Diels et al. |
| D816,820 S * | 5/2018 | Satoh .......................... D23/322 |
| 2012/0255329 A1 | 10/2012 | Wanweerakul |
| 2016/0230719 A1 | 8/2016 | Kato et al. |

(Continued)

FOREIGN PATENT DOCUMENTS

| | | |
|---|---|---|
| AU | 9557701 A | 6/2002 |
| CN | 2272090 Y | 1/1998 |
| CN | 201696758 U | 1/2011 |

(Continued)

OTHER PUBLICATIONS

China National Intellectual Property Administration, Office Action and Search Report Issued in Application No. 201880066772.1, dated Jun. 18, 2021, 13 pages.

(Continued)

*Primary Examiner* — Patrick F Brinson
(74) *Attorney, Agent, or Firm* — Alleman Hall Creasman & Tuttle LLP

(57) ABSTRACT

A corrugated tube with a plurality of wave valleys and wave crests, which are alternately arranged in a longitudinal direction of the corrugated tube, and a plurality of wave flanks, which connect the wave valleys and the wave crests to each other, wherein each wave flank comprises a first wave flank section, a second wave flank section, and a bending section arranged between the first wave flank section and the second wave flank section, and wherein the bending section is elastically deformed during bending of the corrugated tube such that the first wave flank section is swiveled in relation to the second wave flank section.

15 Claims, 9 Drawing Sheets

(56) References Cited

U.S. PATENT DOCUMENTS

2016/0305580 A1   10/2016   Zhou et al.

FOREIGN PATENT DOCUMENTS

| CN | 105863906 A | 8/2016 |
|----|-------------|--------|
| DE | 19641806 A1 | 4/1998 |
| DE | 19930151 A1 | 1/2001 |
| DE | 20021348 U1 | 5/2001 |
| DE | 69910589 T2 | 6/2004 |
| EP | 1099894 A1  | 5/2001 |

OTHER PUBLICATIONS

China National Intellectual Property Administration, Office Action and Search Report Issued in Application No. 201880066772.1, dated Jan. 28, 2021, 13 pages.

\* cited by examiner

CORRUGATED TUBE

FIELD

The present invention relates to a corrugated tube.

BACKGROUND

Corrugated tubes or corrugated pipes can be used both in automotive engineering and in any other industrial sector as protective conduits for cables, such as electrical lines. Such a corrugated tube has a corrugation with wave valleys and wave crests alternating in a longitudinal direction of the corrugated tube. In order to produce a wiring harness, the cables are pulled or pushed into the corrugated tube.

The wave valleys are connected to the wave crests by means of wave flanks. When bending such a corrugated tube, transition regions between the wave flanks and the wave valleys or the wave crests form bending regions which deform elastically. When bending the corrugated tube, external regions of the corrugated tube are expanded and internal regions thereof are compressed during the bending. During a sharp bend, the corrugated tube may start to flatten as a result. This may cause the corrugated tube to buckle or be damaged.

SUMMARY

With this as the background, an object of the present invention consists in providing an improved corrugated tube.

Accordingly proposed is a corrugated tube with a plurality of wave valleys and wave crests, which are alternately arranged in a longitudinal direction of the corrugated tube, and a plurality of wave flanks, which connect the wave valleys and the wave crests to each other. In this case, each wave flank comprises a first wave flank section, a second wave flank section, and a bending section arranged between the first wave flank section and the second wave flank section, wherein the bending section is elastically deformed during bending of the corrugated tube such that the first wave flank section is swiveled in relation to the second wave flank section.

By providing the bending section, an additional bending region can be realized in the respective wave flank. That is to say, not only the transition regions between the wave valleys or the wave crests and the wave flanks but also the additional bending sections of the wave flanks act as bending regions during bending of the corrugated tube. This can significantly increase the flexibility of the corrugated tube. Moreover, at the same flexibility, a wave height of a corrugation of the corrugated tube can be reduced. This results in material savings in the production of the corrugated tube. In comparison to corrugated tubes without such bending sections, higher flexibility and dimensional stability can thus be achieved at the same wave height.

The corrugated tube is in particular designed to be rotationally symmetrical to an axis of symmetry or center axis. The longitudinal direction is arranged in parallel to or coincides with the axis of symmetry. The wave valleys, the wave crests, and the wave flanks form a corrugation of the corrugated tube extending in the longitudinal direction. The corrugated tube is preferably produced from a plastic material. For example, the corrugated tube may be produced from polyamide (PA), polyethylene (PE), polypropylene (PP), polytetrafluoroethylene (PTFE), polyvinyl chloride (PVC), or any other suitable plastic material. The corrugated tube is preferably produced from a partially crystalline thermoplastic.

During bending of the corrugated tube, not only the transition regions or roundings between the wave valleys and the wave flanks or between the wave crests and the wave flanks but also the additional bending sections of the wave flanks preferably act as bending regions or bending points. In this respect, two bending regions or bending points are preferably assigned to each bending valley and transition on both sides of the wave valley into a corresponding wave flank. These bending regions or bending points are positioned at a distance from each other in the longitudinal direction. A first bending region and a second bending region are thus assigned to each wave valley. The two bending regions of each wave valley are preferably designed as roundings, in particular as a first rounding and as a second rounding, or can be referred to as such. The two roundings connect the respective wave valley on both sides to the wave flanks. The wave valleys may be smooth or may have a protrusion. Each wave valley preferably has a cylindrical geometry.

Accordingly, two bending regions or bending points are also preferably assigned to each wave crest and transition on both sides of the wave crest into a corresponding wave flank. These bending regions or bending points are positioned at a distance from each other in the longitudinal direction. A first bending region and a second bending region are thus assigned to each wave crest. The two bending regions of each wave crest are in particular designed as roundings, in particular as a first rounding and as a second rounding, or can be referred to as such. The two roundings connect the wave crest on both sides to the wave flanks. The wave crests may be smooth. Each wave crest preferably has a cylindrical geometry.

In a particularly preferred development of the corrugated tube, the corrugated tube preferably comprises a plurality of wave valleys and wave crests, which are alternately arranged in a longitudinal direction of the corrugated tube, and a plurality of wave flanks, which connect the wave valleys and the wave crests to each other, wherein each wave valley preferably transitions into the wave flanks, in particular into two wave flanks arranged on both sides of the wave valley, by means of two bending regions or bending points, preferably by means of a first bending region or a first bending point, in particular a first rounding, and a second bending region positioned at a distance from the first bending region in the longitudinal direction or a second bending point, in particular a second rounding. In this case, each wave flank comprises a first wave flank section, a second wave flank section, and a bending section arranged between the first wave flank section and the second wave flank section, wherein the bending section is elastically deformed during bending of the corrugated tube such that the first wave flank section is swiveled in relation to the second wave flank section. Accordingly, each wave crest can also transition into the wave flanks, in particular into two wave flanks arranged on both sides of the wave crest, by means of two bending regions or bending points, preferably by means of a first bending region or a first bending point, in particular a first rounding, and a second bending region positioned at a distance from the first bending region in the longitudinal direction or a second bending point, in particular a second rounding.

In a further, particularly preferred development of the corrugated tube, the corrugated tube comprises a plurality of wave valleys and wave crests, which are alternately arranged in a longitudinal direction of the corrugated tube, and a plurality of wave flanks, which connect the wave valleys and the wave crests to each other, wherein each wave flank comprises a first wave flank section, a second wave flank section, and a bending section arranged between the first wave flank section and the second wave flank section, wherein the bending section is elastically deformed during bending of the corrugated tube such that the first wave flank section is swiveled in relation to the second wave flank section, wherein each wave valley transitions into two, in particular adjacent wave flanks by means of a first rounding and by means of a second rounding arranged at a distance from the first rounding in the longitudinal direction, and wherein the roundings act as bending regions during bending of the corrugated tube.

The bending sections may also be called bending points. Each bending section in particular forms an interface between the respective first wave flank section and the corresponding second wave flank section. In this case, the bending section may be part of the first wave flank section and/or the second wave flank section. The bending section in particular forms a hinge, preferably a single-axis hinge, about which the first wave flank section can swivel in relation to the second wave flank section or vice versa. A "single-axis hinge" is to be understood in particular as a hinge that has only one bending axis or hinge axis. Two wave flanks, which are obliquely inclined with respect to the longitudinal direction, are assigned to each wave valley or to each wave crest. In particular, two oppositely inclined wave flanks are assigned to each wave valley or to each wave crest. The first wave flank section in particular extends in the shape of a ring or disk around the axis of symmetry. The second wave flank section likewise preferably extends in the shape of a ring or disk around the axis of symmetry. The bending section in particular also extends in the shape of a ring or disk around the axis of symmetry. The wave flanks thus preferably do not extend in the shape of a screw or helix around the axis of symmetry. The wave valleys, the wave crests, the first wave flank section, the second wave flank section, and the bending section are designed as a single piece, in particular as a single piece of material. The corrugated tube is preferably produced by means of an extrusion process. The corrugation can be molded onto the corrugated tube by means of a so-called corrugator. The wave valleys may be designed to be wavy and may thus be called wavy wave valleys.

According to one embodiment, the first wave flank section and the second wave flank section are arranged at an offset to each other in the longitudinal direction.

That is to say, a distance is provided between the first wave flank section and the second wave flank section when viewed in the longitudinal direction. This distance is bridged by the bending section. It can thereby be achieved that only the bending section and not the wave flank sections are deformed deliberately during bending of the corrugated tube.

According to a further embodiment, the first wave flank section is inclined at a first inclination angle in relation to the longitudinal direction, and the second wave flank section is inclined at a second inclination angle in relation to the longitudinal direction.

In particular, the first wave flank section is inclined at the first inclination angle in relation to the axis of symmetry, and the second wave flank section is inclined at the second inclination angle in relation to the axis of symmetry. The first inclination angle and the second inclination angle are not equal to 90°. That is to say, the first wave flank section and the second wave flank section are not positioned orthogonally to the longitudinal direction or to the axis of symmetry. The first inclination angle and/or the second inclination angle may, for example, be approximately 85°.

According to a further embodiment, the first inclination angle and the second inclination angle are of different sizes or of the same size.

In the case that the first inclination angle and the second inclination angle are of the same size, the first wave flank section and the second wave flank section are positioned in parallel to each other. In particular, a third inclination angle may be provided between the first wave flank section and the second wave flank section. The third inclination angle is, for example, 155° to 157°, more preferably 160° to 170°, more preferably 165°.

According to a further embodiment, on the side facing an internal space of the corrugated tube, the first wave flank section transitions into the second wave flank section by means of an arcuate first rounding.

The first rounding in particular comprises an arc, preferably a circular arc. The first rounding may, for example, comprise several arcs so that the bending section has a cross-section curved in the shape of an S and connects the first wave flank section to the second wave flank section.

According to a further embodiment, the first rounding is arranged tangentially to the first wave flank section and/or to the second wave flank section.

As previously mentioned, the first rounding can thus connect the first wave flank section and the second wave flank section to each other by means of the bending section curved in the shape of an S.

According to a further embodiment, on the side facing away from the internal space, the first wave flank section transitions into the second wave flank section by means of an arcuate second rounding.

The second rounding in particular faces the surroundings of the corrugated tube.

According to a further embodiment, the second rounding is arranged tangentially to the first wave flank section and/or to the second wave flank section.

The second rounding may in particular have several arcs, preferably circular arcs, whereby the bending section, as previously mentioned, may have a cross-section with an S-shaped geometry. The second rounding preferably comprises two arcs, in particular two circular arcs, of which one each is positioned tangentially to the corresponding wave flank section. The two arcs in turn are positioned tangentially to each other.

According to a further embodiment, the bending section has the first rounding and the second rounding.

The bending section thus has the previously mentioned curved geometry.

According to a further embodiment, on the side facing away from the internal space, the first wave flank section transitions into the second wave flank section by means of a straight line.

The straight line is positioned in parallel to the longitudinal direction or to the axis of symmetry. In this embodiment of the corrugated tube, the corrugated tube has the straight line on the side facing away from the internal space or facing the surroundings and has the first rounding on the side facing the internal space.

According to a further embodiment, the bending section has the first rounding and the straight line.

The straight line may also be arranged obliquely to the longitudinal direction or obliquely to the axis of symmetry.

According to a further embodiment, the first wave flank section is arranged within the second wave flank section.

That is to say, the second wave flank section extends in the shape of a ring on the outside around the first wave flank section. The first wave flank section and the second wave flank section extend in the radial direction of the corrugated tube from a respective wave valley toward a respective wave crest.

According to a further embodiment, each wave valley has a protrusion facing away from the internal space of the corrugated tube.

That is to say, the protrusion faces the surroundings of the corrugated tube. The protrusion has a cross-section with a concave geometry. The protrusion extends in the shape of a ring around the axis of symmetry. The protrusion serves as an accumulation of material and ensures that an inner surface of the respective wave valley facing the internal space is smooth or flat when viewed in the longitudinal direction. As a result, abrasion of cables located inside at the inner surface during vibrations can be prevented since the inner surface does not have any unevenness or depressions at which the cables could be damaged. The protrusion is optional.

According to a further embodiment, the protrusion is curved in the shape of an arc.

The protrusion is in particular curved in the shape of a circular arc. The protrusion preferably transitions into the respective wave flank, in particular into the respective first wave flank section, by means of two roundings arranged on both sides of the protrusion. As a result, the wave valleys respectively have a wavy geometry and can therefore also be called wavy wave valleys. The roundings are curved in the shape of an arc, in particular in the shape of a circular arc. During bending of the corrugated tube, these roundings can act as bending regions, in particular in addition to the bending sections of the wave flanks, so that only the roundings, which respectively form a transition between the wave valley and the wave flanks, are deformed and the protrusion itself remains undeformed. The protrusion may thus reinforce the respective wave valley so that no undesired deformation of the wave valley in the region of the protrusion takes place but only the roundings are deformed.

According to a further embodiment, each wave valley is smooth on the side facing the internal space.

That is to say, on the side facing the internal space, each wave valley has a circular cylindrical inner surface which is smooth or flat when viewed in the longitudinal direction. Alternatively, the inner surface, like the protrusion, may be curved in the shape of an arc, in particular in the shape of a circular arc. The inner surface is then formed as a depression or groove extending on the inside around the respective wave valley. As a result, a constant wall thickness can be achieved in the wave valleys.

Additional possible implementations of the corrugated tube also include not explicitly mentioned combinations of features or embodiments described above or below with respect to the exemplary embodiments. In this respect, the person skilled in the art will also add individual aspects as improvements or additions to the respective basic form of the corrugated tube.

Further advantageous designs and aspects of the corrugated tube are the subject matter of the dependent claims and of the exemplary embodiments of the corrugated tube described below. The corrugated tube is explained in more detail below based on preferred embodiments with reference to the appended figures.

DETAILED DESCRIPTION

Unless otherwise indicated, identical or functionally identical elements are provided with the same reference signs in the figures.

Figure 1:
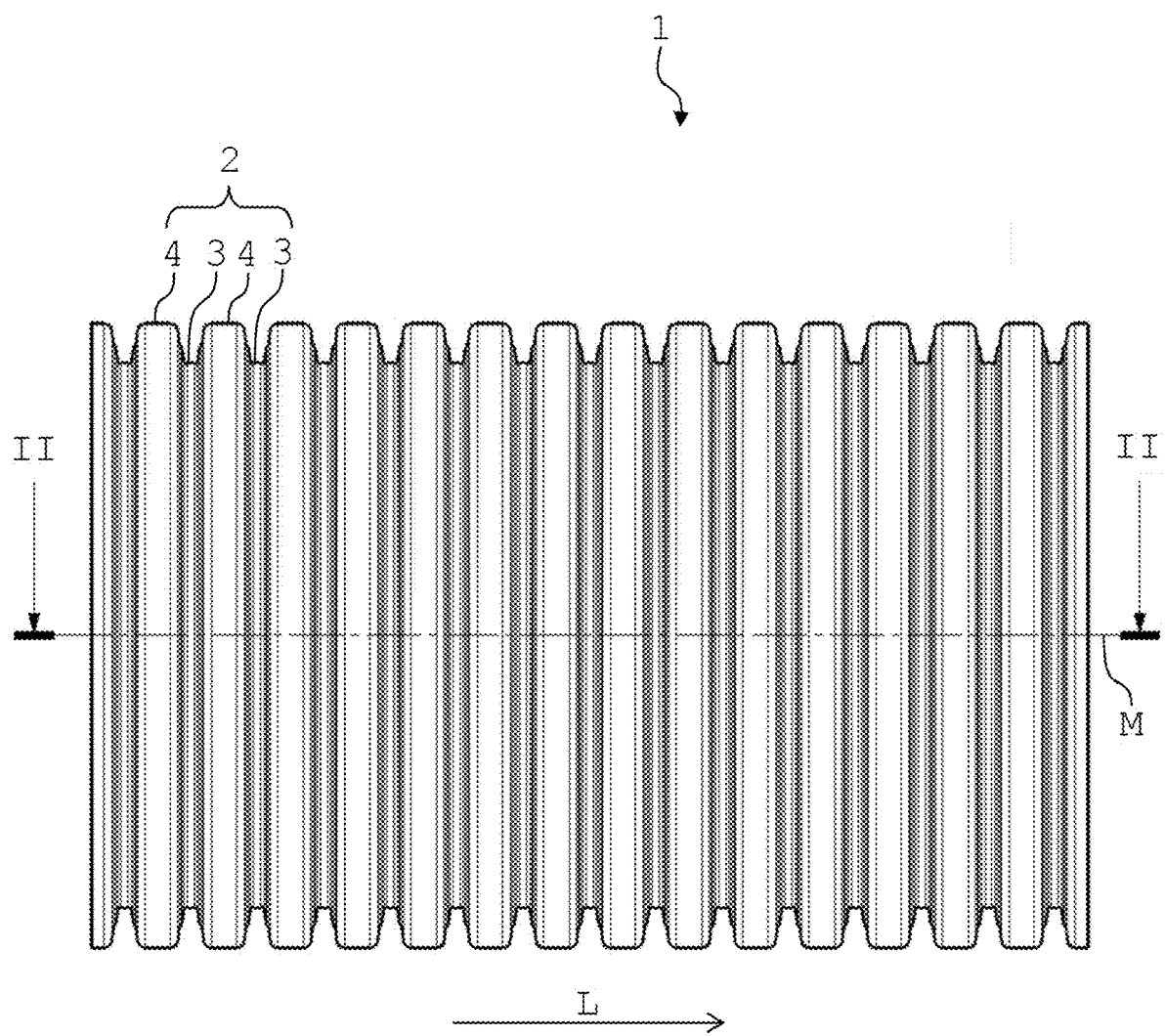
FIG. 1 shows a schematic lateral view of an embodiment of a corrugated tube.
Figure 2:
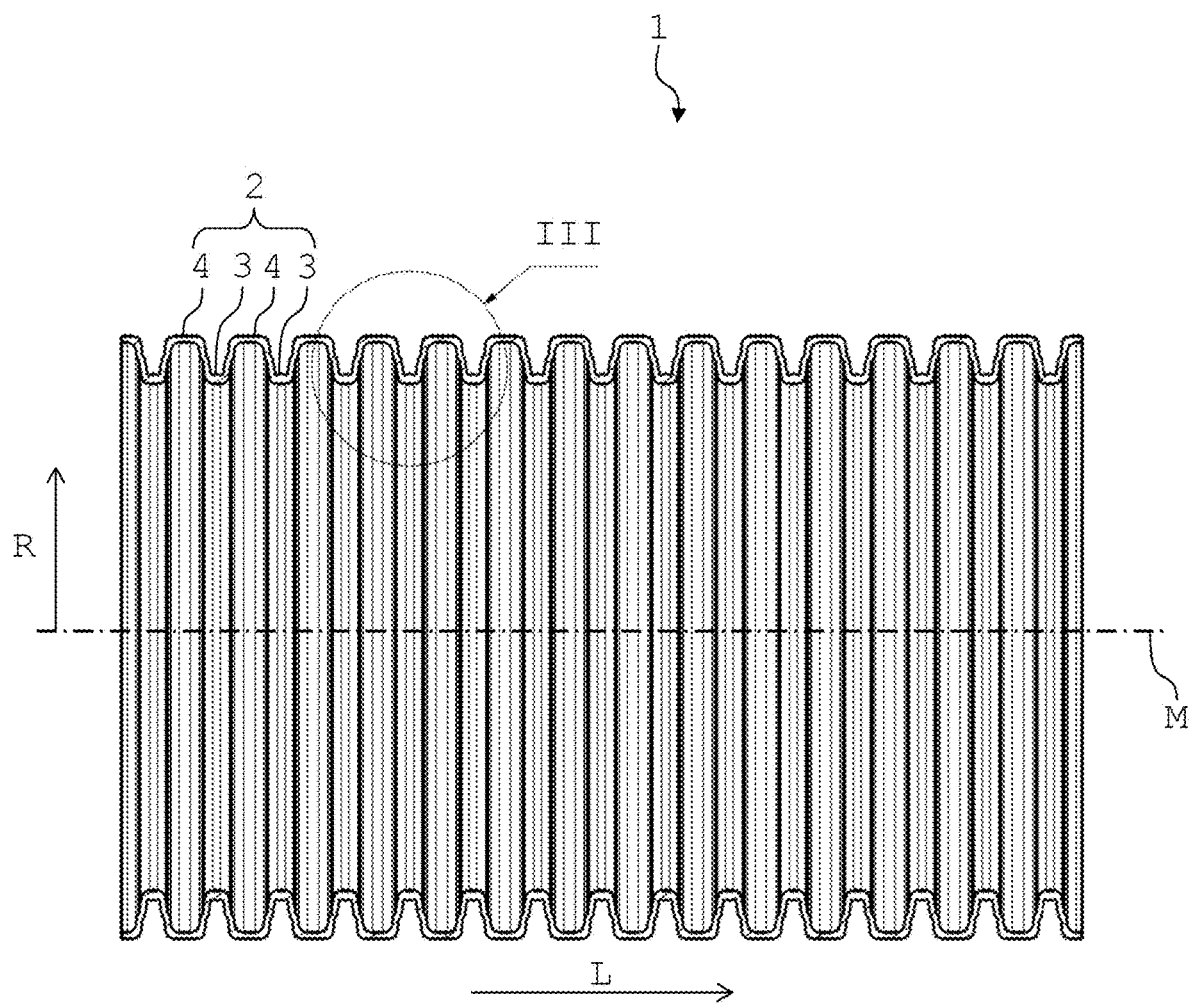
FIG. 2 shows a schematic sectional view of the corrugated tube according to the cutting line II-II of FIG. 1.
Figure 3:
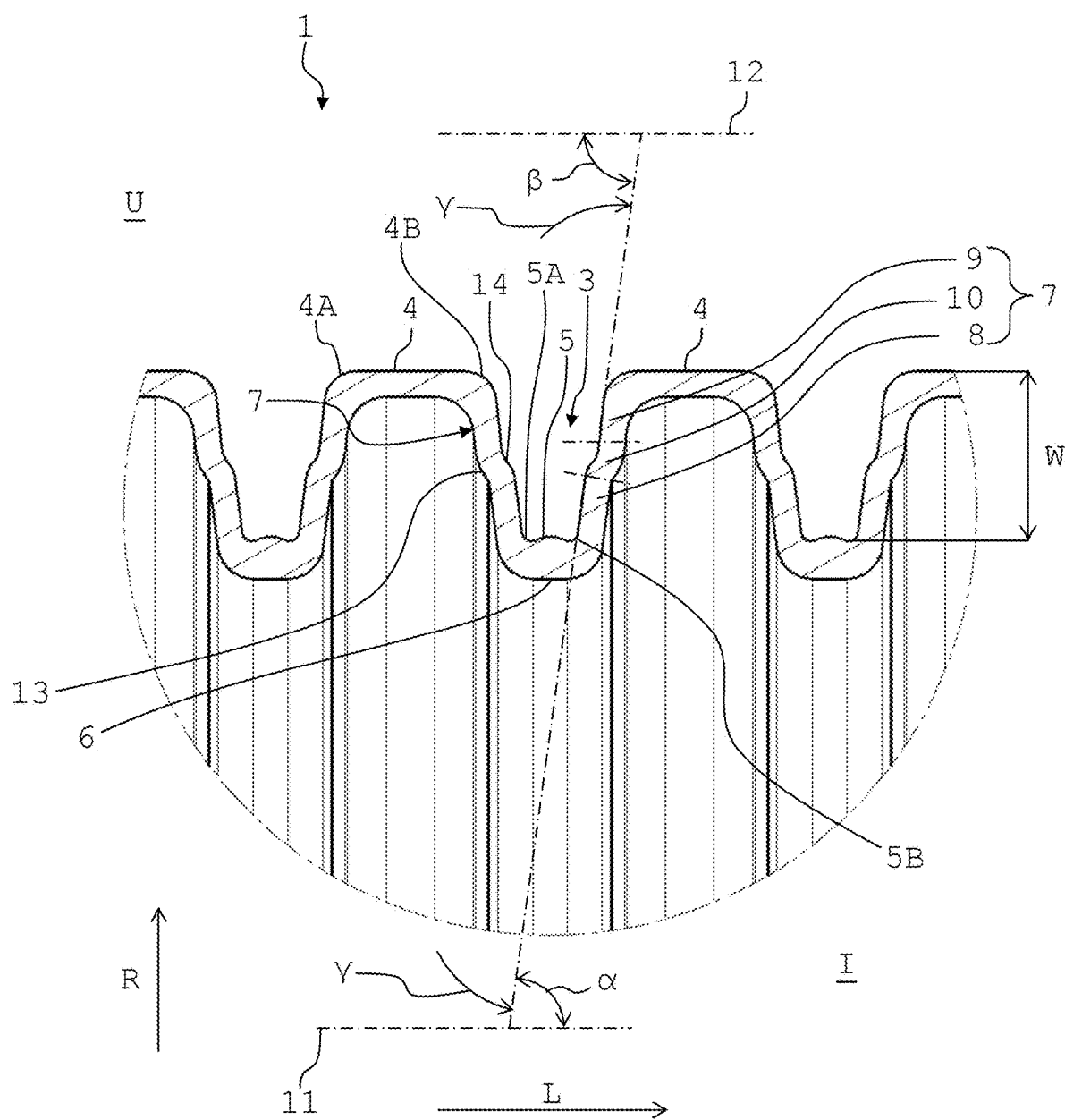
FIG. 3 shows the detailed view III according to FIG. 2.

FIG. 1 shows a schematic lateral view of an embodiment of a corrugated tube 1. FIG. 2 shows a schematic sectional view of the corrugated tube 1 according to the cutting line II-II of FIG. 1, and FIG. 3 shows the detailed view III according to FIG. 2. Below, reference is simultaneously made to FIGS. 1 to 3.

The corrugated tube 1 is in particular suitable for forming a wiring harness. That is to say, the corrugated tube 1 may be part of a wiring harness. For this purpose, a plurality of cables not shown is accommodated in the corrugated tube 1. The cables may also be called lines. The number of cables is arbitrary. The cables may have identical or different diameters and/or cross-sections. In order to form the wiring harness, the cables are pulled or pushed into the corrugated tube 1. The corrugated tube 1 is preferably used in the field of motor vehicle technology. The corrugated tube 1 may however also be used in any other field. The corrugated tube 1 itself may also be a conductor of fluids. For example, the corrugated tube 1 may be a wiper fluid tube.

The cables may be electrical cables, such as single-phase cables, multi-phase cables, coaxial cables, or the like, or fluid lines, such as fuel lines, diesel lines, kerosene lines, hydraulic lines, or pneumatic lines. The corrugated tube 1 is preferably produced from a plastic material. For example, the corrugated tube 1 may be produced from polyamide (PA), polyethylene (PE), polypropylene (PP), polytetrafluoroethylene (PTFE), polyvinyl chloride (PVC), or the like. The corrugated tube 1 is preferably produced by means of an extrusion process.

The corrugated tube 1 may be constructed to be rotationally symmetrical to a center axis or axis of symmetry M. The corrugated tube 1 has a longitudinal direction L, which is arranged in parallel to or coincides with the axis of symmetry M. The longitudinal direction L may be oriented in the orientation of FIGS. 1 to 3 from left to right or vice versa. The corrugated tube 1 also comprises a radial direction R, which is oriented orthogonally to the axis of symmetry M or orthogonally to the longitudinal direction L. In this case, the radial direction R points away from the axis of symmetry M.

The corrugated tube 1 comprises a corrugation 2. The corrugation 2 has a plurality of wave valleys 3 and wave crests 4, which are alternately arranged when viewed in the longitudinal direction L. That is to say, one wave crest 4 is arranged between two wave valleys 3 and vice versa. The number of the wave valleys 3 and of the wave crests 4 is arbitrary. The corrugated tube 1 is in particular a continuous product. In FIGS. 1 and 2, only two wave valleys 3 and two wave crests 4 are respectively provided with a reference sign. As FIG. 3 shows, the corrugation 2 is designed both to face an internal space I of the corrugated tube 1 and to face away from an internal space I. That is to say, the wave valleys 3 and the wave crests 4 are formed to both face the internal space I and face away therefrom. In this case, however, when viewed from the internal space I, the wave valleys 3 are formed as wave crests and the wave crests 4 are formed as wave valleys. It is however assumed below that the corrugation 2 is viewed from surroundings U of the corrugated tube 1 facing away from the internal space I.

As FIG. 3 shows, each wave valley 3 has an optional protrusion 5 facing away from the internal space I, i.e., facing the surroundings U. The protrusion 5 is designed as a rib extending in the shape of a ring around the axis of symmetry M. The wave valleys 3 may also be smooth. The protrusion 5 is in particular designed to have a convex cross-section. In this case, the protrusion 5 is curved in the shape of an arc, in particular in the shape of a circular arc. On the side facing the internal space I, each wave valley 3 has a circular cylindrical inner surface 6 extending around the axis of symmetry M. The protrusion 5 serves as material accumulation in the respective wave valley 3 and ensures that the inner surface 6 is planar or flat when viewed in the longitudinal direction L. As a result, abrasion of the cables located inside at the inner surface 6 during vibrations can be prevented since the inner surface 6 does not have any unevenness or depressions at which the cables could be damaged.

Alternatively, the inner surface 6, like the protrusion 5, may be curved in the shape of an arc, in particular in the shape of a circular arc. The inner surface 6 is then formed as a depression or groove extending on the inside around the respective wave valley 3. As a result, a constant wall thickness can be achieved in the wave valleys 3.

The wave valleys 3 and the wave crests 4 are connected to each other by means of the wave flanks 7 in order to form the corrugation 2. In this case, a first rounding 4A and a second rounding 4B are assigned to each wave crest 4. The roundings 4A, 4B are positioned at a distance from each other when viewed in the longitudinal direction. The roundings 4A, 4B may be called bending regions or bending points. During bending of the corrugated tube 1, the roundings 4A, 4B act as bending regions or bending points so that only the roundings 4A, 4B, which form a transition between the wave crest 4 and the wave flanks 7, are deformed and the wave crest 4 itself in particular remains undeformed. Each wave crest 4 thus transitions via the roundings 4A, 4B assigned thereto into two wave flanks 7.

In this case, the wave flanks 7 extend obliquely to the longitudinal direction L and radially outward from the wave valleys 3 toward the wave crests 4 when viewed in the radial direction R. Two oppositely inclined wave flanks 7 are in this case assigned to each wave valley 3 or each wave crest 4. The previously described protrusion 5 transitions into the respective wave flank 7 by means of roundings 5A, 5B arranged on both sides of the protrusion 5. As a result, the wave valleys 3 respectively have a wavy geometry and can therefore also be called wavy wave valleys 3. The roundings 5A, 5B are curved in the shape of an arc, in particular in the shape of a circular arc. During bending of the corrugated tube 1, the roundings 5A, 5B act as bending regions or bending points so that only the roundings 5A, 5B, which form a transition between the wave valley 3 and the wave flanks 7, are deformed and the protrusion 5 itself remains undeformed. The roundings 5A, 5B are bending regions or bending points or may be referred to as such.

As previously mentioned, the protrusion 5 is however optional. In the case that no protrusion 5 is provided, the wave valleys 3 are smooth and in particular cylindrical. In this case, the roundings 5A, 5B respectively form a transition from the wave valley 3 into the wave flanks 7. During bending of the corrugated tube 1, the roundings 5A, 5B act as bending regions or bending points so that only the roundings 5A, 5B, which form a transition between the wave valley 3 and the wave flanks 7, are deformed and the wave valley 3 itself in particular remains undeformed.

Each wave flank 7 has a first wave flank section 8 extending in the shape of a ring around the axis of symmetry M and a second wave flank section 9 likewise extending in the shape of a ring around the axis of symmetry M. In this case, the first wave flank section 8 is arranged within the second wave flank section 9 when viewed in the radial direction R. The corrugation 2 has a wave height W. The wave height W is defined as the distance between a wave valley 3 and a wave crest 4 when viewed in the radial direction R.

Provided between the first wave flank section 8 and the second wave flank section 9 is a bending section 10, which is configured to be elastically deformed during bending of the corrugated tube 1 such that the first wave flank section 8 is swiveled in relation to the second wave flank section 9. That is to say, the bending section 10 acts as a hinge provided between the first wave flank section 8 and the second wave flank section 9. The respective bending section 10 in this case forms an interface between the first wave flank section 8 and the second wave flank section 9. In this case, the bending section 10 may respectively be part of the first wave flank section 8 and/or the second wave flank section 9. When viewed in the longitudinal direction L, the first wave flank section 8 and the second wave flank section 9 are arranged at an axial offset to each other. That is to say, the bending section 10 acts as a bend between the first wave flank section 8 and the second wave flank section 9. The bending section 10 may also be called a bending point.

The first wave flank section 8 is inclined at a first inclination angle α in relation to the longitudinal direction L or to the axis of symmetry M. The second wave flank section 9 is inclined at a second inclination angle ß in relation to the longitudinal direction L or to the axis of symmetry M. For measuring the inclination angles α, ß, FIG. 3 shows two auxiliary straight lines 11, 12, which are arranged in parallel to the longitudinal direction L or to the axis of symmetry M.

The first inclination angle α and the second inclination angle ß may be of the same size so that the first wave flank section 8 and the second wave flank section 9 are inclined at the same inclination in relation to the longitudinal direction L or to the axis of symmetry M. Alternatively, the first inclination angle α and the second inclination angle ß may be of different sizes so that the first wave flank section 8 and the second wave flank section 9 are differently inclined in relation to the longitudinal direction L or to the axis of symmetry M. The first wave flank section 8 may then be inclined at a third inclination angle Y in relation to the second wave flank section 9. The third inclination angle Y is then not equal to 180°, in particular less than 180°.

The bending section 10 has a first rounding 13 and a second rounding 14. The first rounding 13 faces the internal space I of the corrugated tube 1. In this case, the first wave flank section 8 transitions into the second wave flank section 9 by means of the first rounding 13. The first rounding 13 is curved in the shape of an arc, in particular in the shape of a circular arc. In this case, the first rounding 13 is arranged tangentially to the second wave flank section 9.

The second rounding 14 faces away from the internal space I and faces the surroundings U. In this case, on the side facing away from the internal space I, the first wave flank section 8 transitions into the second wave flank section 9 by means of the second rounding 14. The second rounding 14 is also curved in the shape of an arc, in particular in the shape of a circular arc. The second rounding 14 is in this case arranged tangentially to the first wave flank section 8 and to the second wave flank section 9. For this purpose, the second rounding 14 comprises two arcs, in particular two circular arcs, of which one each is positioned tangentially to the corresponding wave flank section 8, 9. The two arcs in turn are positioned tangentially to each other. The bending section 10 can thus have a cross-section with an S-shaped geometry.

Figure 4:
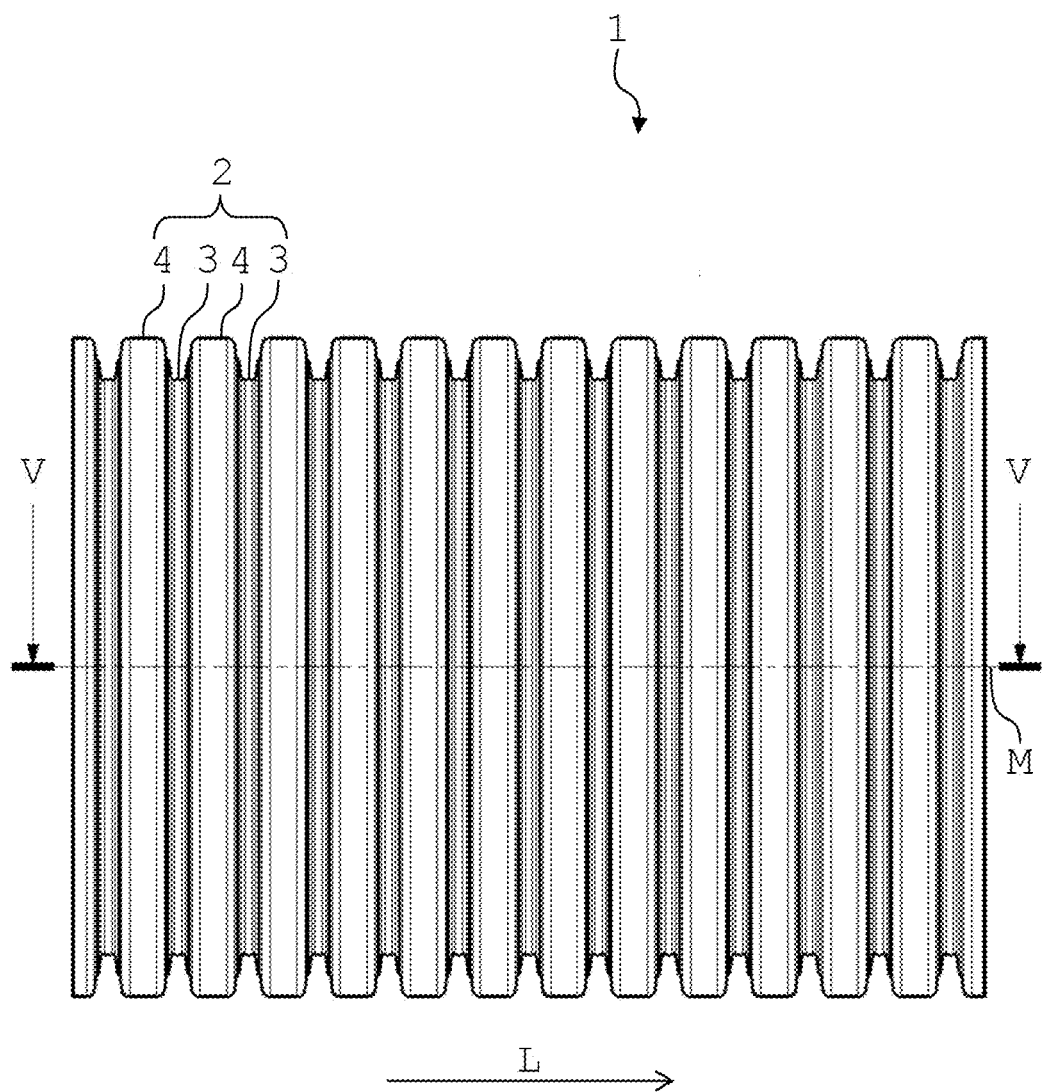
FIG. 4 shows a schematic lateral view of a further embodiment of a corrugated tube.
Figure 5:
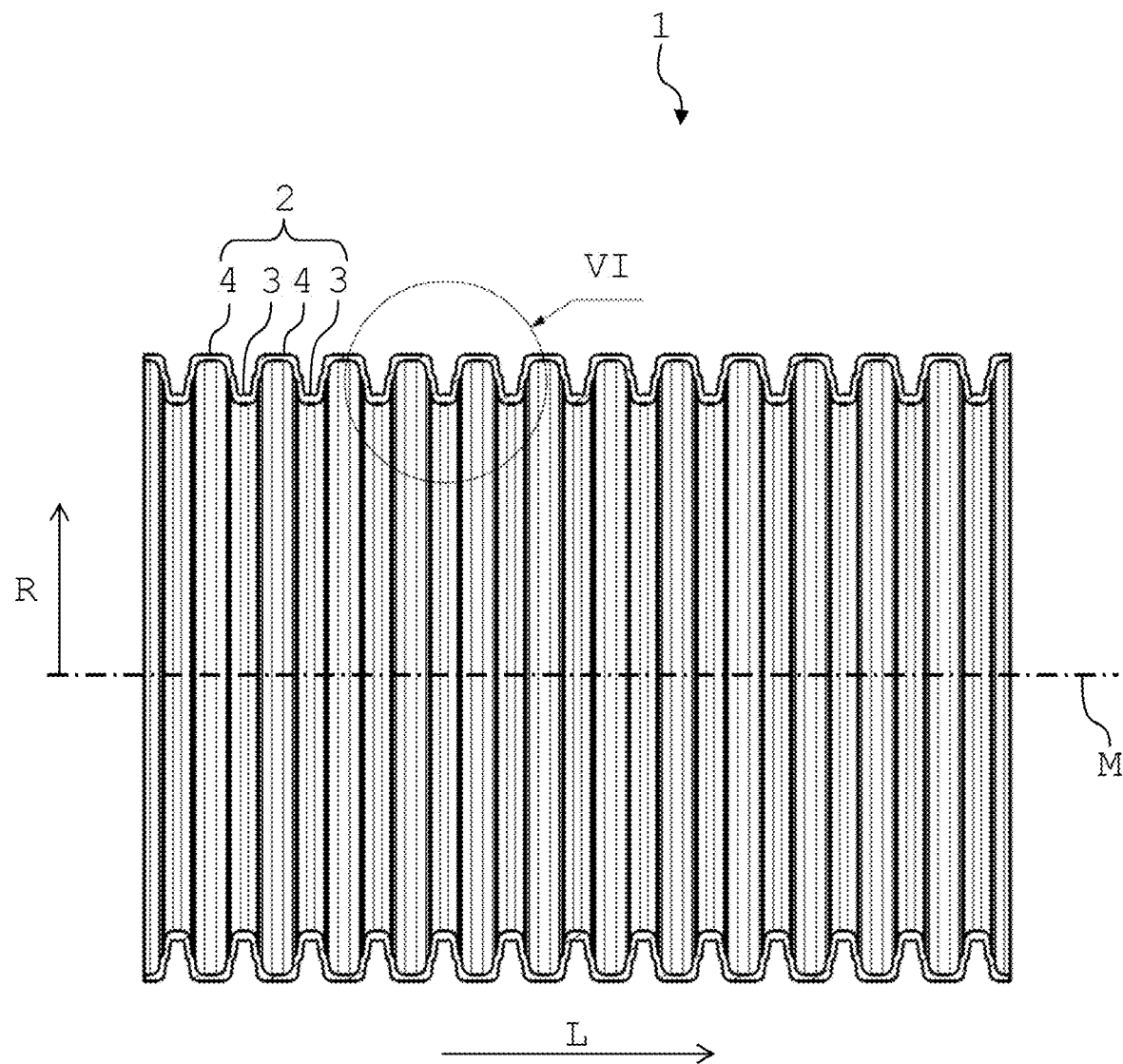
FIG. 5 shows a schematic sectional view of the corrugated tube according to the cutting line V-V of FIG. 4.
Figure 6:
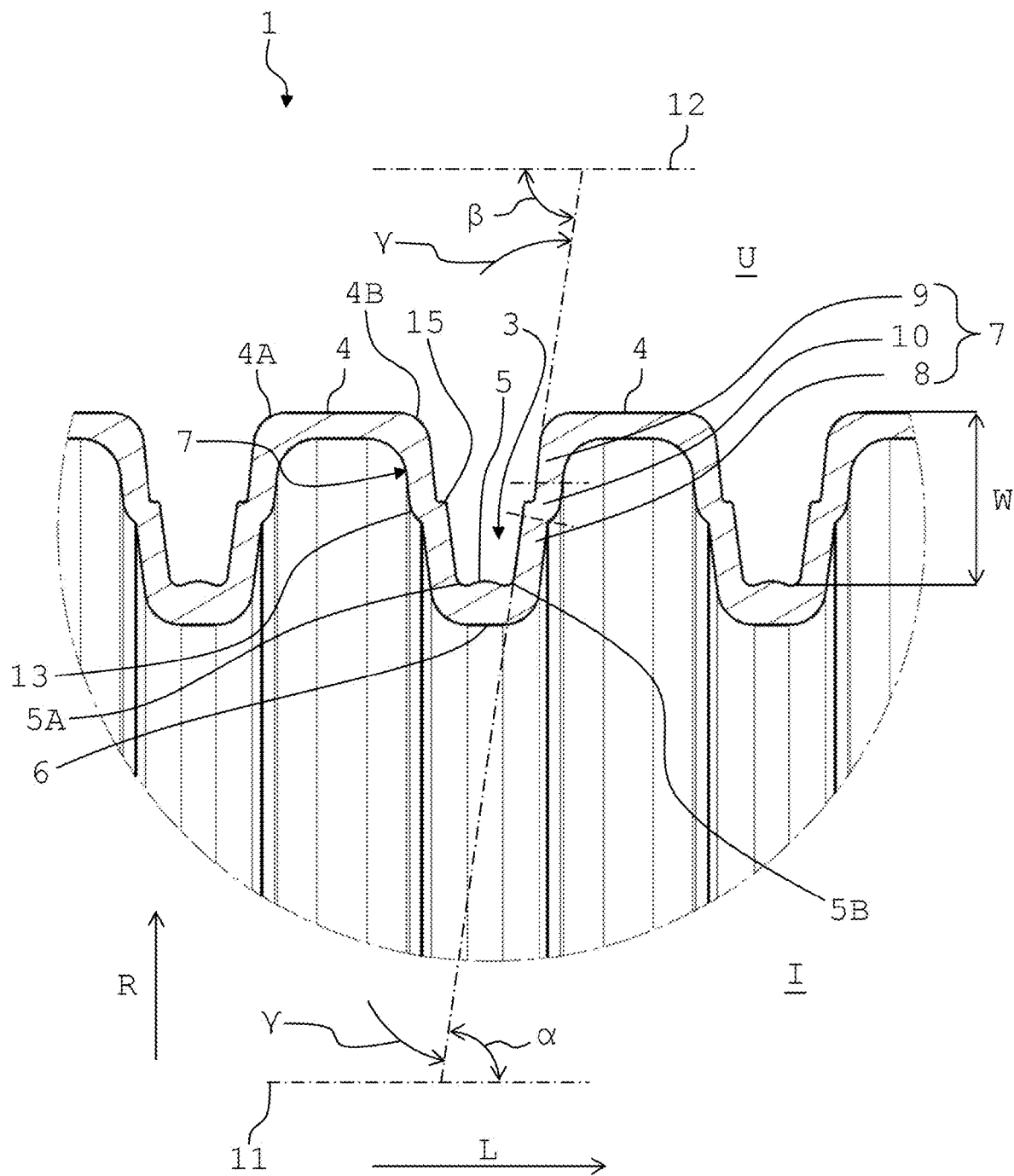
FIG. 6 shows the detailed view VI according to FIG. 5.

FIG. 4 shows a schematic lateral view of a further embodiment of a corrugated tube 1. FIG. 5 shows a schematic sectional view of the corrugated tube 1 according to the cutting line V-V of FIG. 4, and FIG. 6 shows the detailed view VI according to FIG. 5. Below, reference is simultaneously made to FIGS. 4 to 6.

The corrugated tube 1 according to FIGS. 4 to 6 differs from the corrugated tube 1 according to FIGS. 1 to 3 only in that on the side facing away from the internal space I, i.e., facing the surroundings U, the bending section 10 does not have a second rounding 14 but a straight line 15 extending in parallel to the longitudinal direction L or the axis of symmetry M. In this case, on the side facing away from the internal space I, i.e., facing the surroundings U, the first wave flank section 8 transitions into the second wave flank section 9 by means of the straight line 15.

Figure 7:
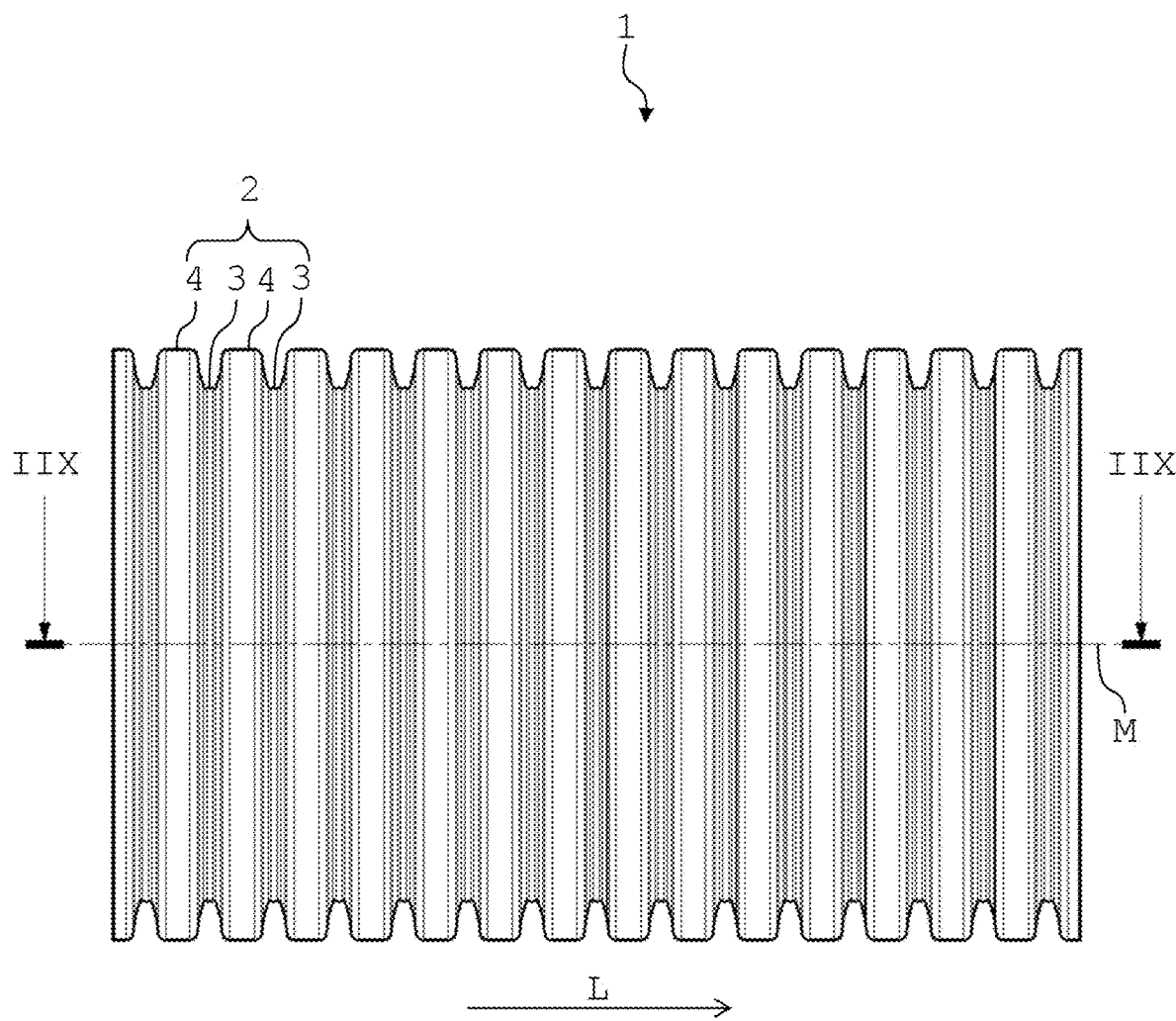
FIG. 7 shows a schematic lateral view of a further embodiment of a corrugated tube.
Figure 8:
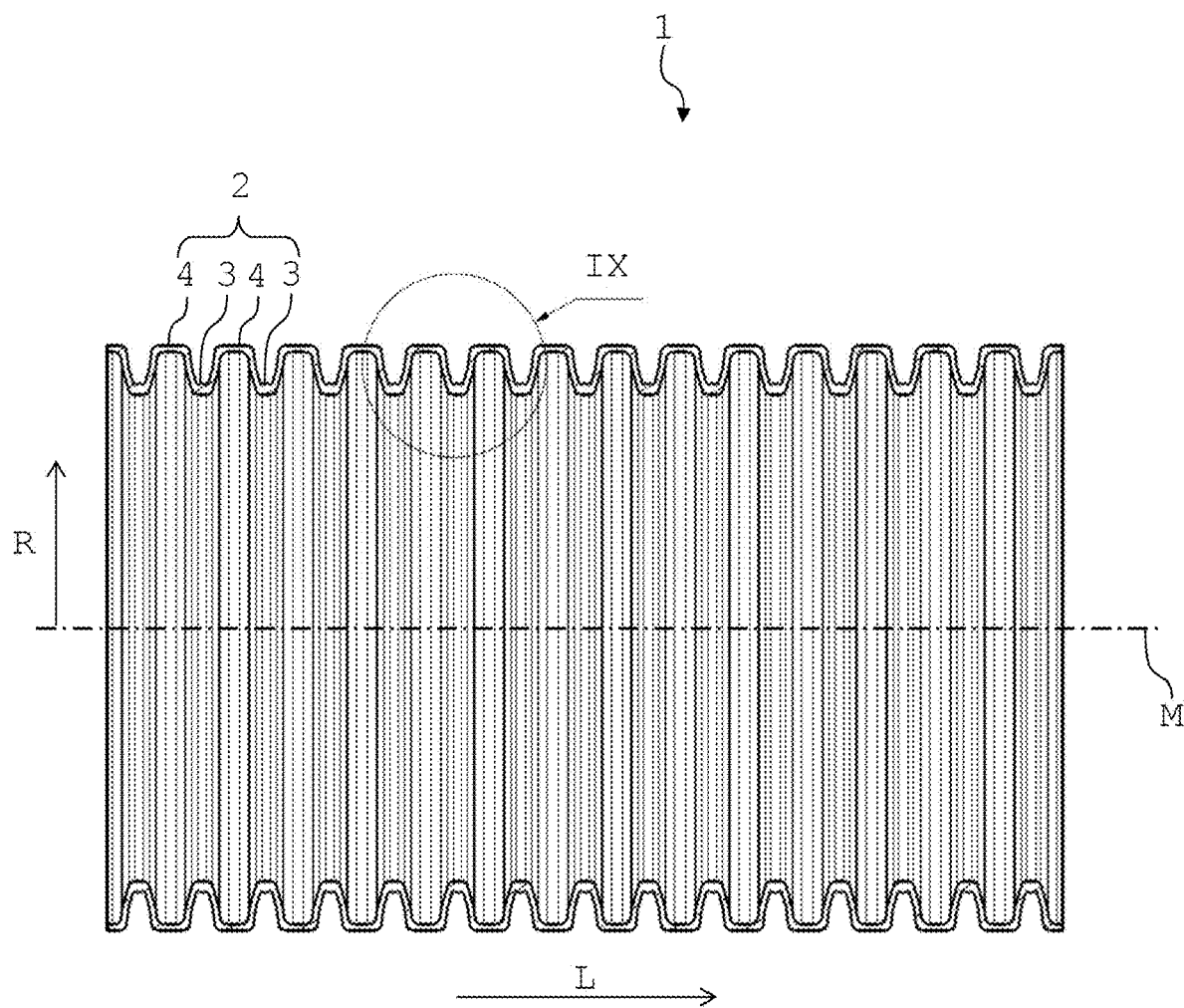
FIG. 8 shows a schematic sectional view of the corrugated tube according to the cutting line IIX-IIX of FIG. 7.
Figure 9:
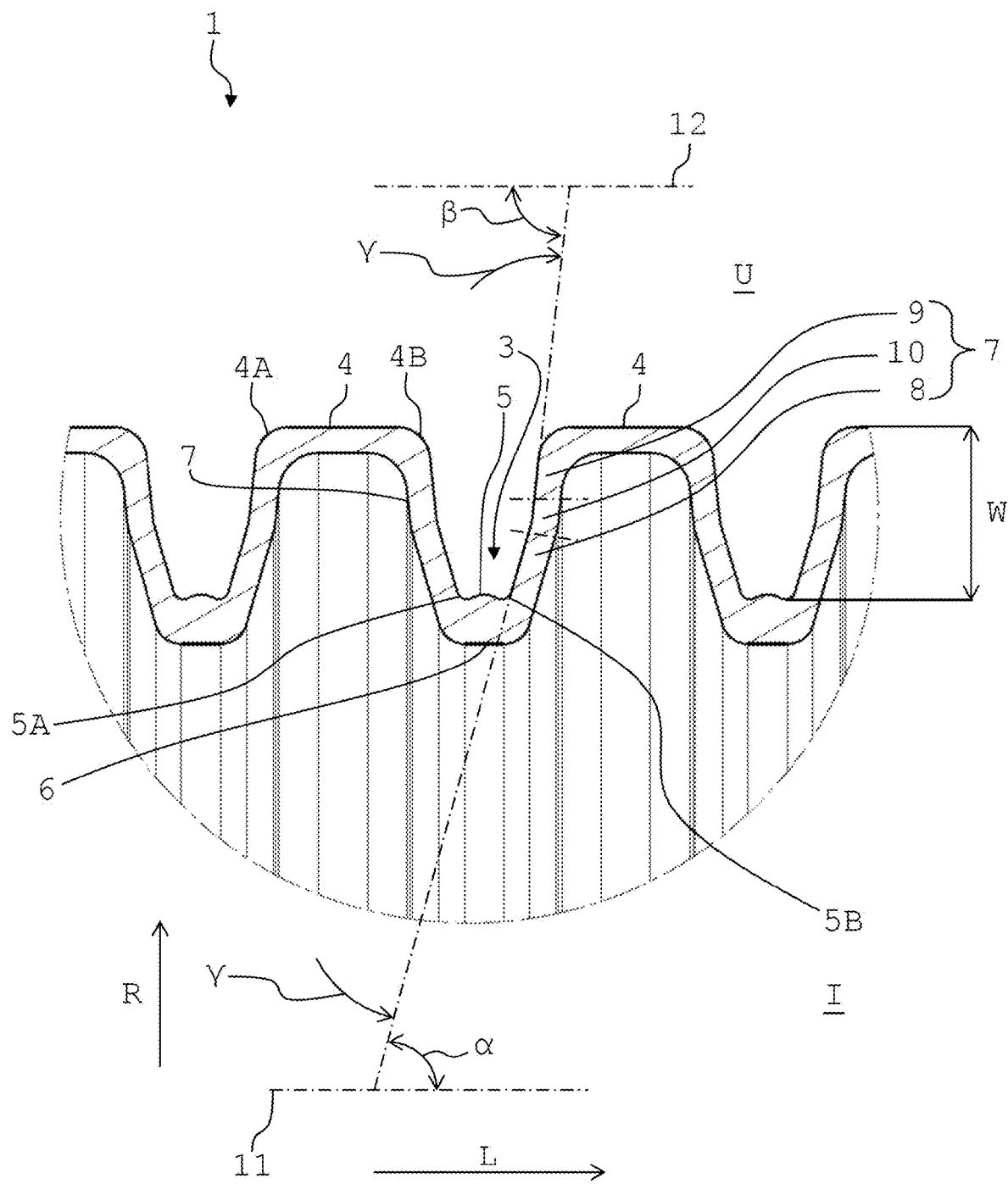
FIG. 9 shows the detailed view IX according to FIG. 8.

FIG. 7 shows a schematic lateral view of a further embodiment of a corrugated tube 1. FIG. 8 shows a schematic sectional view of the corrugated tube 1 according to the cutting line IIX-IIX of FIG. 7, and FIG. 9 shows the detailed view IX according to FIG. 8. Below, reference is simultaneously made to FIGS. 7 to 9.

The embodiment of the corrugated tube 1 according to FIGS. 7 to 9 differs from the embodiment of the corrugated tube 1 according to FIGS. 1 to 3 in that the bending section 10 has neither a first rounding 13 facing the internal space I as described above nor a second rounding 14 facing away from the internal space I. In this embodiment of the corrugated tube 1 according to FIGS. 7 to 9, the first wave flank section 8 and the second wave flank section 9 are not offset to each other when viewed in the longitudinal direction L. That is to say, the bending section 10 is designed as a bend connecting the first wave flank section 8 and the second wave flank section 9. The first wave flank section 8 is inclined at the third inclination angle Y in relation to the second wave flank section 9.

The functionality of the corrugated tube 1 according to all previously described embodiments is described below. By providing the bending section 10, two additional bending points or bending regions may be assigned to each wave valley 3 or each wave crest 4. The bending sections 10 in this case act as additional bending regions, which allow bending of the corrugated tube 1 in addition to a respective transition of the wave flanks 7 into the respective wave valley 3, in particular the roundings 5A, 5B, or into the respective wave crest 4. This can significantly increase the flexibility of the corrugated tube 1. The protrusion 5 in the wave valleys 3 allows for a smooth inner surface 6 whereby damage to cables accommodated in the corrugated tube 1 can be prevented.

The force transmission of the corrugated tube 1 can be improved in comparison to corrugated tubes without additional bending sections 10. The wave height W of the corrugation 2 can be reduced at the same flexibility of the corrugated tube 1 in comparison to known corrugated tubes. This results in material savings in the production of the corrugated tube 1. At the same wave height W, higher flexibility and higher dimensional stability can thus be achieved in comparison to known corrugated tubes.

Although the present invention was described based on exemplary embodiments, it can be modified in various ways.

LIST OF REFERENCE CHARACTERS

1 Corrugated tube
2 Corrugation
3 Wave valley
4 Wave crest
4A Rounding
4B Rounding
5 Protrusion
5A Rounding
5B Rounding
6 Inner surface
7 Wave flank
8 Wave flank section
9 Wave flank section
10 Bending section
11 Auxiliary straight line
12 Auxiliary straight line
13 Rounding
14 Rounding
15 Straight line
I Internal space
L Longitudinal direction
M Axis of symmetry
R Radial direction
U Surroundings
W Wave height
α Inclination angle
ß Inclination angle
Y Inclination angle

The invention claimed is:

1. Corrugated tube comprising:
a plurality of wave valleys and wave crests, which are alternately arranged in a longitudinal direction of the corrugated tube, and
comprises a plurality of wave flanks, which connect the wave valleys and the wave crests to each other,
wherein each wave flank comprises a first wave flank section, a second wave flank section, and a bending section arranged between the first wave flank section and the second wave flank section,
wherein the bending section is elastically deformed during bending of the corrugated tube such that the first wave flank section is swiveled in relation to the second wave flank section,
wherein the bending section forms a hinge about which the first wave flank section is configured to swivel in relation to the second wave flank section or the second wave flank section is configured to swivel in relation to the first wave flank section, and
wherein each wave valley transitions into the wave flanks by means of a first bending region and a second bending region positioned at a distance from the first bending region in the longitudinal direction.

2. Corrugated tube according to claim 1, wherein the first wave flank section and the second wave flank section are arranged at an offset to each other in the longitudinal direction.

3. Corrugated tube according to claim 1, wherein the first wave flank section is inclined at a first inclination angle in relation to the longitudinal direction and wherein the second wave flank section is inclined at a second inclination angle in relation to the longitudinal direction.

4. Corrugated tube according to claim 3, wherein the first inclination angle and the second inclination angle are of different sizes or of the same size.

5. Corrugated tube according to claim 1, wherein on the side facing an internal space of the corrugated tube, the first wave flank section transitions into the second wave flank section by means of an arcuate first rounding.

6. Corrugated tube according to claim 5, wherein the first rounding is arranged tangentially to the first wave flank section and/or to the second wave flank section.

7. Corrugated tube according to claim 5, wherein on the side facing away from the internal space, the first wave flank section transitions into the second wave flank section by means of an arcuate second rounding.

8. Corrugated tube according to claim 7, wherein the second rounding is arranged tangentially to the first wave flank section and/or to the second wave flank section.

9. Corrugated tube according to claim 5, wherein the bending section has the first rounding and the second rounding.

10. Corrugated tube according to claim 5, wherein on the side facing away from the internal space, the first wave flank section transitions into the second wave flank section by means of a straight line.

11. Corrugated tube according to claim 10, wherein the bending section has the first rounding and the straight line.

12. Corrugated tube according to claim 1, wherein the first wave flank section is arranged within the second wave flank section.

13. Corrugated tube according to claim 1, wherein each wave valley has a protrusion facing away from the internal space of the corrugated tube.

14. Corrugated tube according to claim 13, wherein the protrusion is curved in the shape of an arc.

15. Corrugated tube according to claim 13, wherein each wave valley is smooth on the side facing the internal space.

* * * * *

UNITED STATES PATENT AND TRADEMARK OFFICE
CERTIFICATE OF CORRECTION

Page 1 of 1

PATENT NO. : 11,221,094 B2
APPLICATION NO. : 16/754354
DATED : January 11, 2022
INVENTOR(S) : Van Ngoc Chu It is certified that error appears in the above-identified patent and that said Letters Patent is hereby corrected as shown below:

On the Title Page

After item (65), insert:
--(30) Foreign Application Priority Data
Oct. 13, 2017 (DE) 10 2017 123 889.1--

Signed and Sealed this
First Day of March, 2022

Drew Hirshfeld
*Performing the Functions and Duties of the*
*Under Secretary of Commerce for Intellectual Property and*
*Director of the United States Patent and Trademark Office*